March 11, 1958 M. H. MUSE 2,826,143

ELECTROTYPE PRINTING PLATE

Filed Jan. 15, 1954 2 Sheets-Sheet 1

INVENTOR.
MARSHALL H. MUSE
BY
Bruce B. Clyman
ATTORNEY

March 11, 1958 M. H. MUSE 2,826,143

ELECTROTYPE PRINTING PLATE

Filed Jan. 15, 1954 2 Sheets-Sheet 2

INVENTOR.
MARSHALL H. MUSE
BY
Bruce B. Clyman
ATTORNEY

United States Patent Office 2,826,143
Patented Mar. 11, 1958

2,826,143

ELECTROTYPE PRINTING PLATE

Marshall H. Muse, New York, N. Y.

Application January 15, 1954, Serial No. 404,213
5 Claims. (Cl. 101—395)

The present invention relates to a novel electrotype printing plate and to a novel method of making such a plate. More particularly, it relates to an electrotype printing shell having a wire screen stiffening or strengthening layer permanently affixed to its back, which screen layer is able to prevent distortion of the shell as the printing plate is being formed.

In order that the advantages of the present invention may be better understood, the present method of making electrotype printing plates and the difficulties and disadvantages inherent thereto will be first discussed. According to conventional processes, a printing mold, conductive on one face thereof and having a printing pattern on its conductive face, is dipped into an electrolytic bath containing a solution of a copper salt. The printing mold is permitted to remain in the electrolytic bath until a copper printing shell having a thickness of about .003 to .015 inch is formed on the conductive face of the mold. Then, the combined printing shell and mold is removed from the electrolytic bath and immersed in hot water until the mold dissolves or breaks into small particles, thereby leaving the copper printing shell in a free state.

Because of its extreme thinness, the copper printing shell requires a backing up layer so that it may be handled without being distorted or destroyed. In order to provide the copper printing shell with such a backing up layer, the shell is placed face downward in a backing up pan. Next, hot molten lead is poured over the back of the copper printing shell and thereby filling the pan to a level of about one-half inch. After the lead has cooled and solidified, the copper printing shell with the lead backing on it is then removed from the backing up pan.

However, when the molten lead is poured onto the back of the copper printing shell, many difficulties arise. Because of the heat of the molten lead, the copper printing shell will be warped and dimensionally distorted so that it is no longer in registry with the pattern from which it was formed. In order to correct or minimize the distortions, it is necessary that the copper printing shell be treated with a special finishing operation. This finishing is a very delicate hand operation wherein the operators gently hammer the lead backing on the shell in an effort to realign and smooth the warped portions so as to bring the printing surface to a smooth uniform level. For example, if part of the copper printing shell is buckled, the operators will attempt by hammering to take out the buckles and crinkles in order to attain a uniform sheet, as originally formed in the electrolytic bath. This is a very expensive operation and requires considerable experience so that the printing shell is not ruined by over hammering. At the same time, there is no guarantee that the hammering will realign the copper shell to its original form.

When the finishing operation is completed, the copper shell with its lead backing is subjected to a cutting machine which shaves off and levels the lead backing to a suitable thickness. The printing plate is now ready for use.

By my novel method, I am now able to eliminate the difficulties arising when molten lead is poured on top of the thin copper printing shell. I achieve this by first applying a stiffening or strengthening layer of copper wire screen to the back of the copper printing shell. This copper wire screen is applied to the copper printing shell while it is still in the electrolytic bath with the result that the copper wire screen is permanently affixed to and becomes an integral part of the copper printing shell. With such a stiffening or strengthening layer, I have found that the copper printing shell will not buckle, warp or otherwise be distorted when hot lead is poured onto the back of the shell. Thus, I am able to eliminate or at least reduce to a negligible minimum the amount of hand finishing required.

Accordingly, it is a principal object of the present invention to provide a novel electrotype printing plate comprising a copper printing shell, a metal backing up layer, and a stiffening or strengthening layer formed of a metal screen and being disposed between the printing shell and the backing up layer.

It is a further object of the present invention to provide a copper printing shell which will not be distorted or warped when hot molten lead is applied thereto during the process of forming a complete electrotype printing plate.

It is still a further object of the present invention to provide an electrotype printing plate of the above described character including a copper printing shell which is in the same form as when taken from the electrolytic forming bath.

Another object of the present invention is to provide a method for forming an electrotype printing plate as described above.

One advantage of my invention is that it reduces the cost of making each electrotype printing plate by reducing the amount of hand work necessary to correct any irregularities or defects in the printing shell.

Another advantage of my invention stems from the fact that my printing plate will not be out of line or registry with other printing plates formed from the same mold or pattern. This is particularly important in multi-color printing.

Other objects and advantages of the present invention will become more apparent as it is discussed in detail below with particular reference to the accompanying drawings wherein.

Figure 1:
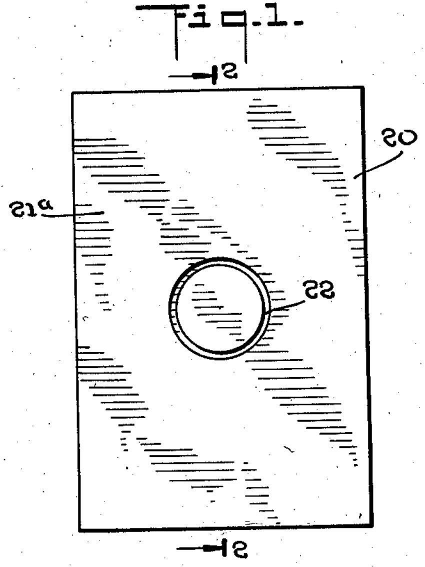
Figure 1 is a front view of a mold used in forming a copper printing shell.
Figure 2:
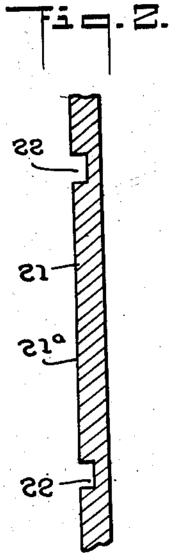
Figure 2 is a fragmental sectional view on line 2—2 of Figure 1 and looking in the direction of the arrows.
Figure 4:
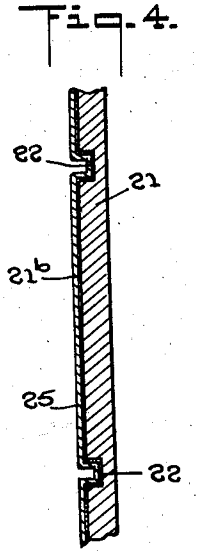
Figure 4 is a fragmental sectional view taken on line 4—4 of Figure 3, looking in the direction of the arrows, and paricularly showing the copper printing shell that has formed on the mold.
Figure 3:
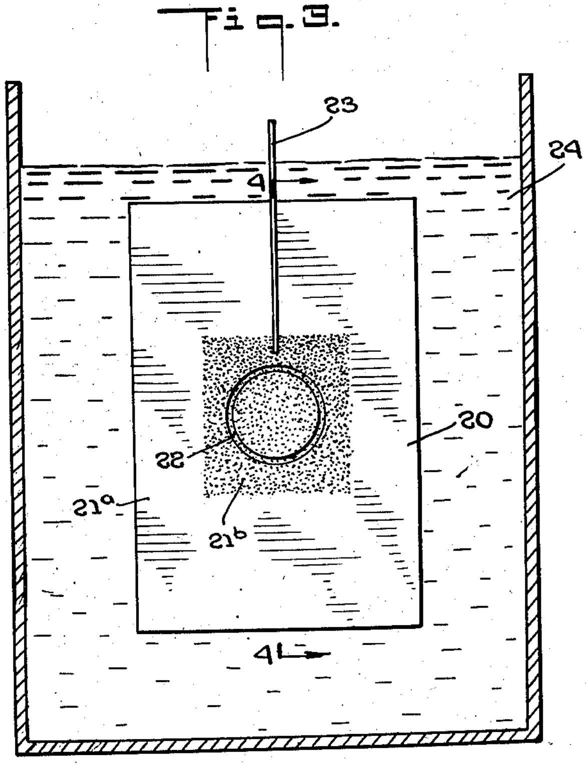
Figure 3 is a sectional view showing the mold of Figure 1 suspended in an electrolytic bath.
Figure 5:
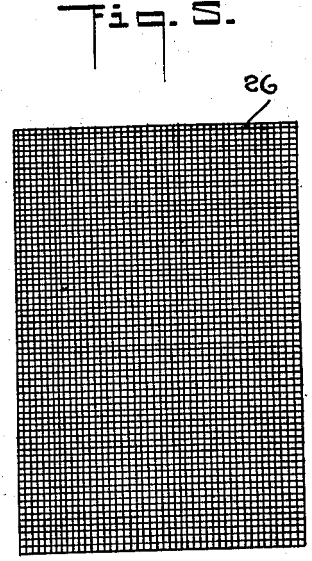
Figure 5 is a front view of a copper wire screen to be applied as a stiffening or strengthening layer to the copper printing shell.
Figures 6, 7, 8, 10:
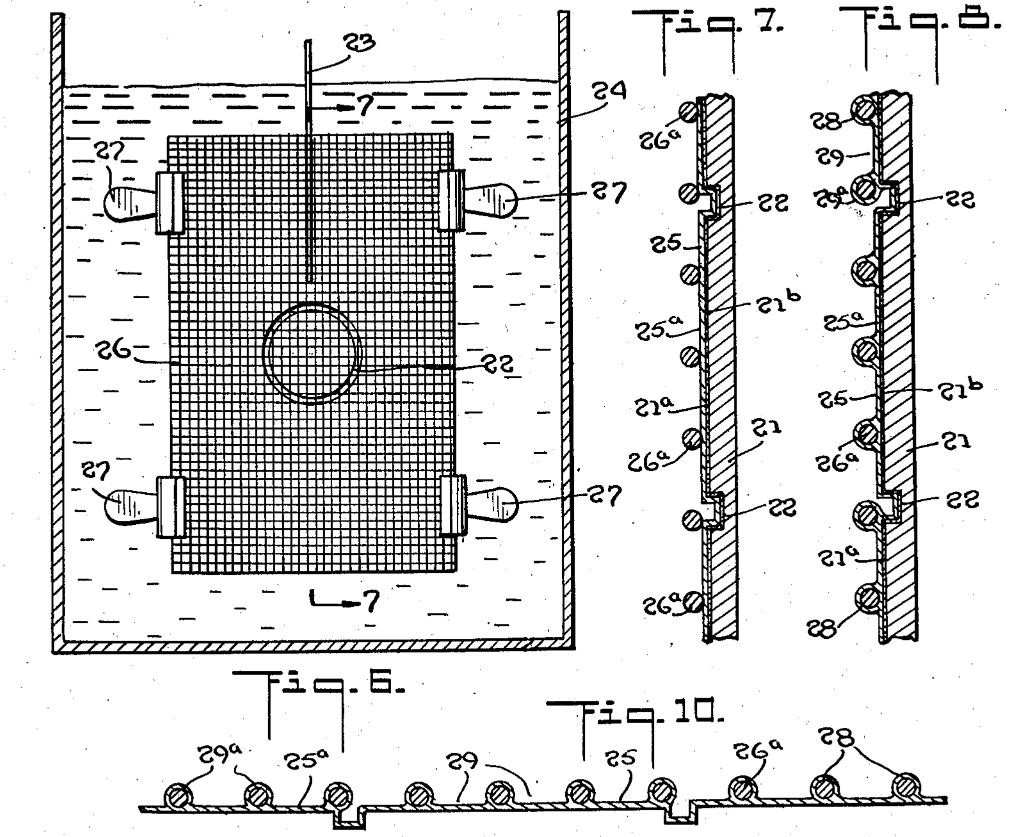
Figure 6 is a view smilar to Figure 4 but showing the copper wire screen clamped to the copper printing shell while it is still in the electrolytic bath.
Figure 7 is a fragmental sectional view taken on line 7—7 of Figure 6, looking in the direction of the arrows, and particularly showing the copper wire screen before it becomes permanently affixed to the back of the printing shell.
Figure 8 is a fragmental sectional view similar to Figure 7 and particularly showing how the copper wire screen has become integrally affixed to the copper printing shell.
Figure 10 is a fragmental horizontal sectional view showing the copper printing shell and copper wire after the mold has been removed.

With particular reference to Figures 1 and 2, there is shown a printing mold 20 comprising a wax layer 21 having an impressed pattern 22 on its front face 21*a*. Other moldable materials such as plastic may also be and conventionally are employed in place of wax.

In order to impress the pattern 22 on the face 21*a*, the mold 20 is pressed downwardly onto a chase containing type or cuts which form the pattern to be reproduced. By pressing the mold 20 onto the raised type or cuts, the desired impressed pattern 22 is created in the face 21*a* of the mold.

Because wax is a non-conductive material, the pattern 22 on the face 21*a* must be dusted with a conductive material so that the metal in the aqueous solution of the electrolytic bath will deposit onto the patterned face of the mold 20. Usually, the pattern is dusted with graphite or sprayed with silver, each of which will provide an exceedingly thin conductive layer 21*b* covering the patterned face 21*a*. The graphite or silver spray must also be employed where the mold is made of a plastic material. A thin wire 23 is provided which extends from a source of electrical energy (not shown) down along the face of the mold 20 and terminates in contact with the thin conductive layer 21*b* on the patterned part of the face 21*a*.

Next, the mold 20 is immersed in an electrolytic bath 24 containing a solution of a copper salt, such as copper sulfate. Since this electrolytic bath 24 is a well known device, I have not described it here in any detail or shown it in detail in the drawings.

While the mold 20 is in the electrolytic bath 24, a layer of copper will deposit on the face 21*a* of the wax layer 21. The pattern 22 will be transmitted to the copper layer as it deposits on the face 21*a* of the wax layer 21 so that the copper layer becomes the copper printing shell 25. So far, I have described practices which are well known and standard in the art of forming electrotype printing plates. I will now describe those particular features which comprise my invention.

When the copper shell 25 has attained the desired thickness, which is usually but not limited to .003 to .015 inch, the combined mold 20 and copper shell 25 are temporarily removed from the electrolytic bath 24 and a copper wire screen 26 is held to the back 25*a* of the copper printing shell by non-conductive clamps 27. Any arrangement of clamps 27 may be employed as desired. For example, although it is not shown, a thin clamp may be extended across the middle of the wire screen 26 to insure surface contact between all parts of the wire screen 26 and the copper printing shell 25. Moreover, the wire screen 26 should be clamped to the combined mold 20 and copper printing shell 25 in a very taut manner so that it is in contact generally throughout its surface with the back 25*a* of the copper printing shell.

The combined mold 20 and copper printing shell 25, with the wire screen 26 clamped thereto, is then inserted into the electrolytic bath 24 and suspended there until the individual strands 26*a* of the copper wire screen 26 become integrally affixed to the back 25*a* of the copper printing shell 25. This occurs in the following manner. As the copper continues to deposit out from solution, it will form a layer 28 of copper around the exposed surfaces of the strands 26*a*. In other words, the strands 26*a* will be encased in the copper layer 28, which layer, itself, shall be integrally a part of both the strands 26*a* and the copper printing shell 25. Thus, the copper wire screen 26 and the copper printing shell 25 become a single copper unit.

The copper wire screen that I employ may be of any size mesh. For example, a copper wire screen of the type used for window screening would be suitable for my purposes.

At any time after the copper wire screen 26 is firmly affixed to the copper shell 25 and before the copper wire screen is completely buried beneath a layer of copper, I remove the mold 20 and copper printing shell 25 from the electrolytic bath 24. By removing the copper printing shell 25 from the electrolytic bath 24 before it is completely covered with a layer of copper, the copper layer 28 will have a rough surface which will extend along the back of the copper printing shell 25 and will consist of a plurality of depressions 29 surrounded by ridges 29*a*. The depressions 29 and ridges 29*a* result from the copper solution plating out on the strands 26*a* and in the interspaces between the strands. The rough surface formed by the depressions 29 and ridges 29*a* will provide an excellent gripping surface for the lead which will be eventually solidified on the back of the copper printing shell 25. In other words, the lead backing up layer will be more firmly fixed to the copper printing shell 25 because the lead will solidify in the depressions 29.

After the clamps 27 have been removed, the combined mold 20 and copper printing shell 25 are placed into a pan 30 with the printing shell lying face downwardly. The pan 30 is then filled with hot water so that the wax layer 21, after it has softened, can be stripped away from the copper printing shell 25.

The copper printing shell 25 with the copper wire screen 26 permanently affixed thereto is then placed face downwardly into a cast iron backing up pan 32. Next, a thin layer of tin foil 34 is placed over the back of the copper printing shell 25 and the shell is heated until the tin foil is melted. Ordinarily, molten lead will not adhere to copper. However, when a molten layer of tin foil is spread over the back of the copper shell 25, then the molten lead will adhere to the copper shell. Molten lead 31 or any suitable lead alloy is then poured onto the back of the copper printing shell 25 until the printing shell is covered to the usual depth of about one-half inch. The usual care is taken and means provided to see that the molten lead 31 does not under run the copper printing shell 25 and destroy the printing face. When the molten lead 31 has cooled and solidified, the combined copper printing shell 25, wire screen 26 and cooled layer of lead 31 is removed from the pan 32. It will be noted that the copper printing shell 25 has not been buckled, warped or otherwise distorted by the application of the hot molten lead 31.

Figure 12:
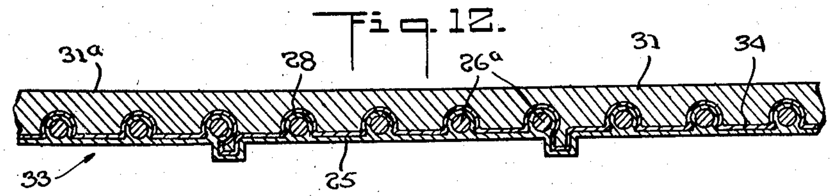
Figure 12 is a fragmental horizontal sectional view showing the finished electrotype printing plate.
Figure 11:
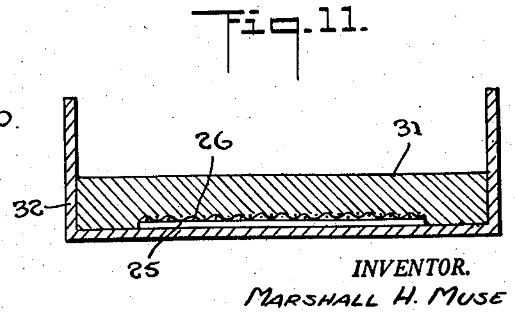
Figure 11 is a sectional view showing the copper printing shell lying face downward in a pan containing molten lead.
Figure 9:
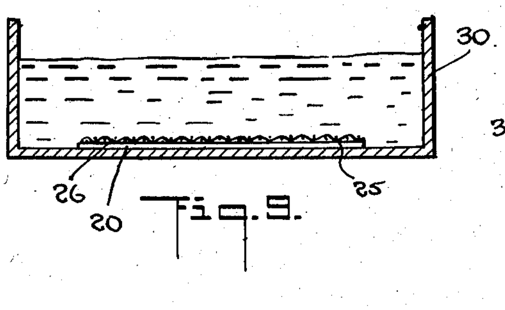
Figure 9 is a sectional view showing the combined mold and printing shell lying in a hot water bath.

The back 31*a* of the layer of lead 31 is shaved down to a suitable thickness by a conventional cutting machine and the edges of the layer of lead are trimmed to the desired size. Thus, there is provided my novel electrotype printing plate 33, seen in cross section in Figure 12, comprising copper printing shell 25, the lead backing layer 31 and the stiffening or strengthening copper wire screen 26 which is integrally a part of the printing shell and which is disposed between the printing shell and the lead backing layer.

While my invention has been described in detail and shown with respect to the accompanying drawings, it is not to be limited to such details since many changes and modifications may be made in the invention without departing from the spirit and scope thereof. Hence, it is desired to cover any and all forms and modifications of the invention which may come within the language and scope of any one or more of the appended claims.

I claim:

1. A printing plate comprising a metal printing shell, a metal backing layer adapted to reinforce said printing shell, and metal meshed means disposed between said metal printing shell and said metal backing layer, said meshed means being plated to said printing shell by a layer of metal encasing said meshed means.

2. An electrotype printing plate comprising a metal printing shell, a metal backing layer adapted to reinforce said printing shell, and a layer of metal meshed means disposed between said metal printing shell and said metal backing layer, said meshed means being of the same metal as said printing shell and further being integrally affixed to the back thereof by a layer of metal encasing said meshed means.

3. An electrotype printing plate comprising a copper printing shell, metal backing means adapted to reinforce said copper printing shell, and a copper wire screen disposed between said copper printing shell and said metal backing means, said copper wire screen being integrally affixed to the back of said printing shell by virtue of a layer of copper encasing said screen.

4. A printing plate comprising a copper printing shell, a metal backing layer, and a stiffening layer formed of a metal screen and being disposed between the printing shell and the backing layer, said metal screen being integrally a part of said printing shell by virtue of a layer of copper encasing said screen.

5. An electrotype printing plate comprising a thin layer of copper, said thin layer adapted to serve as a printing face, a lead backing layer adapted to reinforce said thin layer of copper, and a stiffening layer formed of copper screen means, said screen means being integrally affixed to said thin copper layer by a further copper layer encasing said screen means and further being sandwiched between said thin copper layer and said lead backing layer.

References Cited in the file of this patent

UNITED STATES PATENTS

| | | |
|---|---|---|
| 793,315 | McIndoe | June 27, 1905 |
| 851,049 | Wood | Apr. 23, 1907 |
| 1,003,187 | Leuchter | Sept. 12, 1911 |
| 1,033,435 | McKee | July 23, 1912 |
| 1,208,808 | McIndoe et al. | Dec. 19, 1916 |
| 1,589,665 | Schmutz | June 22, 1926 |
| 2,101,591 | Muse | Dec. 7, 1937 |
| 2,305,852 | Durham | Dec. 22, 1942 |

FOREIGN PATENTS

| | | |
|---|---|---|
| 486,639 | Canada | Sept. 16, 1952 |